(12) United States Patent
Meng et al.

(10) Patent No.: US 11,210,845 B2
(45) Date of Patent: Dec. 28, 2021

(54) POINT CLOUD DATA REFORMATTING

(71) Applicant: Pony AI Inc., Grand Cayman (KY)

(72) Inventors: Pingfan Meng, San Bruno, CA (US);
Michael Wu, San Jose, CA (US);
Brian James Rush, La Jolla, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/855,935

(22) Filed: Apr. 22, 2020

(65) Prior Publication Data
US 2021/0335033 A1    Oct. 28, 2021

(51) Int. Cl.
*G06T 15/00* (2011.01)
*G06T 17/00* (2006.01)
*G06T 7/70* (2017.01)
*G01S 17/894* (2020.01)

(52) U.S. Cl.
CPC .......... *G06T 17/00* (2013.01); *G01S 17/894* (2020.01); *G06T 7/70* (2017.01); *G06T 2207/10028* (2013.01)

(58) Field of Classification Search
CPC .......... G06T 5/00; G06T 15/00; G06T 15/04; G06T 17/00; G06K 9/00
USPC ........................................................ 345/418
See application file for complete search history.

(56) References Cited

U.S. PATENT DOCUMENTS

| | | | |
|---|---|---|---|
| 7,804,498 B1 | 9/2010 | Graham et al. | |
| 8,610,706 B2 * | 12/2013 | Zhou | G06T 17/20 345/419 |
| 8,780,112 B2 * | 7/2014 | Kontkanen | G06T 1/60 345/426 |
| 9,251,399 B2 | 2/2016 | Hwang et al. | |
| 9,508,191 B2 * | 11/2016 | Tabellion | G06T 15/506 |
| 9,562,971 B2 | 2/2017 | Shenkar et al. | |
| 10,694,210 B2 * | 6/2020 | Chou | H04N 19/96 |

(Continued)

OTHER PUBLICATIONS

Pavez E, Chou PA. Dynamic polygon cloud compression. In2017 IEEE International Conference on Acoustics, Speech and Signal Processing (ICASSP) Mar. 5, 2017 (pp. 2936-2940). IEEE. (Year: 2017).*

(Continued)

*Primary Examiner* — Phu K Nguyen
(74) *Attorney, Agent, or Firm* — Sheppard Mullin Richter & Hampton LLP

(57) ABSTRACT

Described herein are systems, methods, and computer readable media for performing data conversion on sensor data to obtain modified sensor data that is formatted/structured appropriately for downstream processes that rely on the sensor data as input. The sensor data can include point cloud data captured by a LiDAR, for example. A grid structure and corresponding grid characteristics can be determined and the sensor data can be converted to grid-based sensor data by associating the grid structure and its characteristics with the sensor data. Generating the grid-based sensor data can include reformatting the point cloud data to superimpose the grid structure and its grid characteristics onto the point cloud data. Various downstream processing that cannot feasibly be performed on the raw sensor data can then be performed efficiently on the modified grid-based sensor data by virtue of the grid structure imbuing the sensor data with spatial proximity information.

19 Claims, 5 Drawing Sheets

(56) References Cited

U.S. PATENT DOCUMENTS

| | | | |
|---|---|---|---|
| 10,803,561 B2* | 10/2020 | Ponto | G06T 15/005 |
| 10,885,703 B2* | 1/2021 | Kerckaert | G06T 17/005 |
| 10,904,564 B2* | 1/2021 | Yea | H04N 19/124 |
| 2011/0161804 A1 | 6/2011 | Park et al. | |
| 2013/0031282 A1 | 1/2013 | Amini et al. | |
| 2013/0202197 A1 | 8/2013 | Reeler et al. | |
| 2019/0202467 A1 | 7/2019 | Sun et al. | |

OTHER PUBLICATIONS

Thanou D, Chou PA, Frossard P. Graph-based compression of dynamic 3D point cloud sequences. IEEE Transactions on Image Processing. Feb. 11, 2016;25(4):1765-78. (Year: 2016).*

International Search Report and Written Opinion for PCT/US2021/028324 dated Jul. 13, 2021, 13 pages.

Zhao et al., "Towards Safety-Aware Computing System Design in Autonomous Vehicles", arXiv preprint arXiv: 1905.08453 (2019) May 22, 2019, retrieved on Jun. 13, 2021 from https://arxiv.org/pdf/1905.08453.pdf, 20 pages.

* cited by examiner

POINT CLOUD DATA REFORMATTING

The present invention relates generally to data conversion and data reformatting, and more particularly, in some embodiments, to conversion and reformatting of point cloud data using characteristics of a grid structure.

BACKGROUND

On-board sensors in a vehicle, such as an autonomous vehicle, supplement and bolster the vehicle's field-of-view (FOV) by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board sensors include, for example, cameras, light detection and ranging (LiDAR) systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle, which may then be processed to calculate various vehicle parameters and determine safe driving operations of the vehicle.

An autonomous vehicle performs a myriad of complex calculations based on the sensor data captured from on-board vehicle sensors to facilitate a multitude of operations required for autonomous vehicle operation such as object detection, object classification, object tracking, collision avoidance, vehicle navigation, vehicle acceleration and deceleration, and the like. In some instances, data generated by a sensor may be raw data that is not formatted or structured in a manner that enables the aforementioned calculations to be performed on such data. Discussed herein are technical solutions that address technical drawbacks associated with the use of raw sensor data to perform downstream autonomous vehicle processing.

SUMMARY

In an example embodiment, a computer-implemented method for performing data conversion of sensor data is disclosed. The computer-implemented method includes receiving the sensor data and determining one or more grid characteristics of a grid structure containing multiple grid unit elements. The method further includes converting the sensor data to grid-based sensor data that enables downstream processing to be performed and performing the downstream processing on the grid-based sensor data. Converting the sensor data to grid-based sensor data includes associating the grid structure with the sensor data.

In an example embodiment, the sensor data includes point cloud data. In an example embodiment, associating the grid structure with the sensor data includes reformatting the point cloud data in accordance with the one or more grid characteristics to obtain the grid-based sensor data. In an example embodiment, reformatting the point cloud data in accordance with the one or more grid characteristics includes determining which grid unit element of the plurality of grid unit elements each data point in the point cloud data corresponds to. In an example embodiment, the point cloud data includes at least one of two-dimensional (2D) data or three-dimensional (3D) data. In an example embodiment, the sensor data includes a respective timestamp associated with each data point of the point cloud data. In an example embodiment, the method includes downsampling the point cloud data at least in part by discarding a portion of the point cloud data that is not necessary for the downstream processing.

In an example embodiment, the one or more grid characteristics include at least one of a size of the grid structure or a granularity of the grid structure. In an example embodiment, determining the one or more grid characteristics includes determining the granularity of the grid structure based at least in part on a distribution of data points of the point cloud data.

In an example embodiment, the grid-based sensor data is first grid-based sensor data, and the method further includes determining that the first grid-based sensor data includes a particular grid unit element containing no data points of the point cloud data, modifying the one or more grid characteristics, and reformatting the point cloud data in accordance with the one or more modified grid characteristics to obtain second grid-based sensor data. In an example embodiment, the particular grid unit element in the second grid-based sensor data contains at least one data point of the point cloud data. In an example embodiment, modifying the one or more grid characteristics includes increasing a granularity of the grid structure. In an example embodiment, increasing the granularity of the grid structure includes increasing a number of grid unit elements contained in the grid structure.

In an example embodiment, the downstream processing includes tracking movement of a vehicle. In an example embodiment, tracking the movement of the vehicle includes determining a first set of grid unit elements containing a first portion of the point cloud data corresponding to a position of the vehicle at a first time, determining a second set of grid unit elements that are in a localized region around the first set of grid unit elements within the grid structure, and searching only the second set of grid unit elements for a second portion of the point cloud data corresponding to a position of the vehicle at a second time.

In an example embodiment, a system for performing data conversion of sensor data is disclosed. The system includes at least one processor and at least one memory storing computer-executable instructions. The at least one processor is configured to access the at least one memory and execute the computer-executable instructions to perform a set of operations including receiving the sensor data and determining one or more grid characteristics of a grid structure containing multiple grid unit elements. The set of operations further include converting the sensor data to grid-based sensor data that enables downstream processing to be performed and performing the downstream processing on the grid-based sensor data. Converting the sensor data to grid-based sensor data includes associating the grid structure with the sensor data. The above-described system is further configured to perform any of the operations/functions and may include any of the additional features/aspects of example embodiments of the invention described above in relation to example computer-implemented methods of the invention.

In an example embodiment, a computer program product for performing data conversion of sensor data is disclosed.

The computer program product includes a non-transitory computer-readable medium readable by a processing circuit. The non-transitory computer-readable medium stores instructions executable by the processing circuit to cause a method to be performed. The method includes receiving the sensor data and determining one or more grid characteristics of a grid structure containing multiple grid unit elements. The method further includes converting the sensor data to grid-based sensor data that enables downstream processing to be performed and performing the downstream processing on the grid-based sensor data. Converting the sensor data to grid-based sensor data includes associating the grid structure with the sensor data. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Overview

Figure 1:
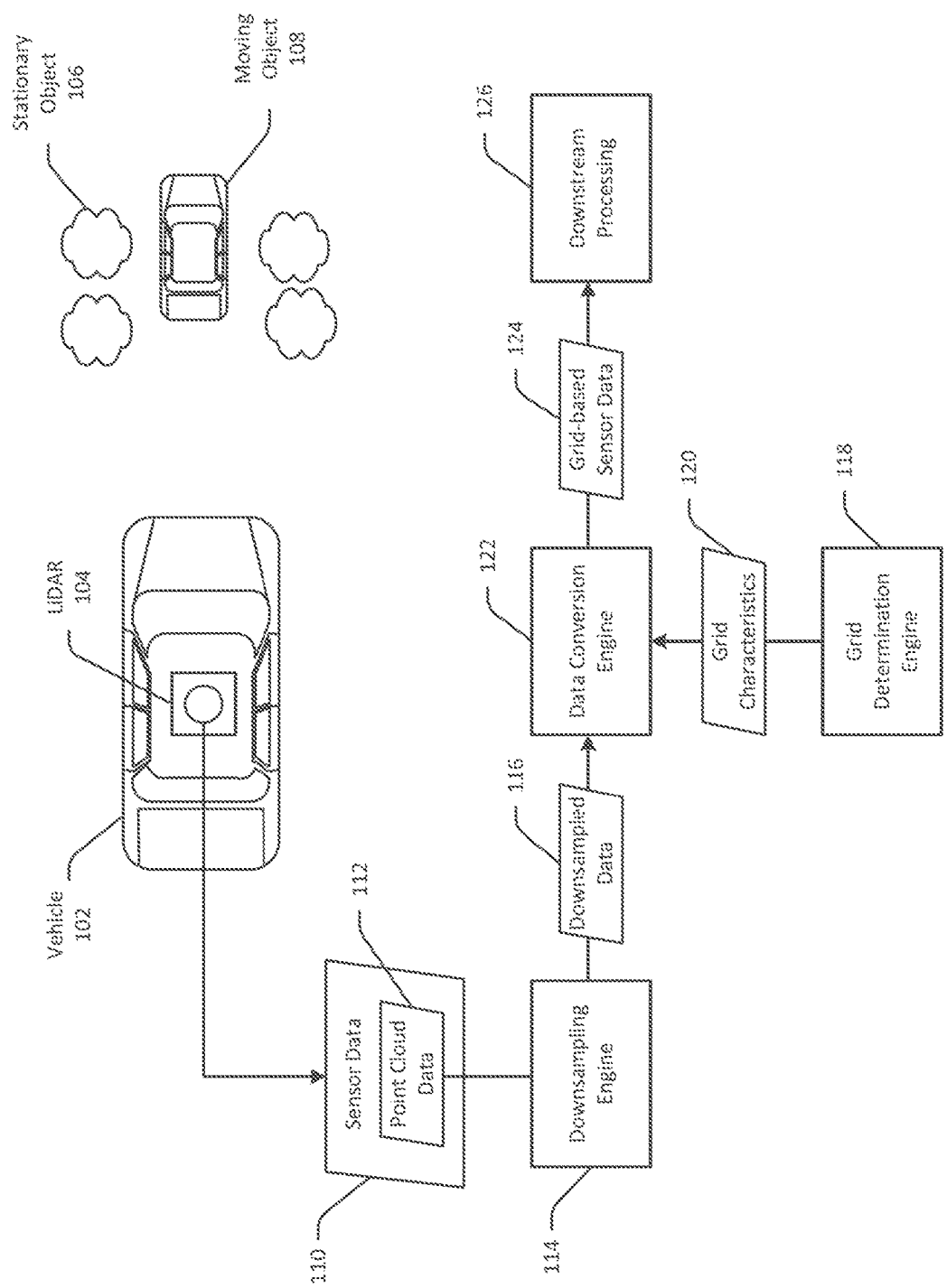
FIG. 1 is a hybrid block and data flow diagram illustrating data conversion of sensor data in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have a myriad of sensors onboard the vehicle. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous or driverless vehicle. For example, LiDARs can be utilized to detect objects (e.g., other vehicles, road signs, pedestrians, buildings, etc.) in an environment around a vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to recognize, interpret, and/or identify objects captured in images or visual cues of the objects. Data collected from these sensors can be processed and used, as inputs, to algorithms configured to make various autonomous driving decisions including decisions relating to when and how much to accelerate, decelerate, change direction, or the like.

In various example embodiments of the invention, the myriad of on-board sensors provide continuous streams of sensor data that, in turn, are provided as input to algorithms that perform complex calculations in order to facilitate a multitude of operations required for safe autonomous vehicle operation such as object detection, object classification, object tracking, collision avoidance, vehicle navigation, vehicle acceleration and deceleration, and the like.

Often, such downstream calculations require the input sensor data for the calculations to have a suitable structure/format. Sensor data captured by an on-board vehicle sensor such as a LiDAR, however, is raw point cloud data captured as the LiDAR periodically scans its environment, and is not suitably formatted/structured for downstream autonomous vehicle processing tasks such as object recognition, object tracking, or the like. More specifically, while sensor data such as LiDAR data includes point cloud data representative of light pulses that are reflected back from objects in the scanned environment and corresponding timestamps of receipt, the LiDAR data does not provide an indication of spatial proximity of objects in the environment represented by the point cloud data. As a result, it becomes highly inefficient and impractical to perform tasks such as object detection and object tracking directly on LiDAR data. For instance, in the case of object tracking, the absence of spatial proximity information in the LiDAR data can result in having to process a overly cumbersome amount of data while attempting to track an object's location over time.

Various embodiments of the invention overcome technical problems specifically arising in the realm of computer-based technology, and more specifically, in the realm of autonomous vehicle technology. In particular, example embodiments of the invention provide technical solutions to the above-described technical problem in the form of systems, methods, non-transitory computer-readable media, techniques, and methodologies for converting sensor data such as LiDAR data into a format/structure that enables downstream processing to be performed on the data and/or that improves processing performance by making the processing performed on such data substantially more efficient. In particular, in example embodiments, upon receipt of sensor data such as LiDAR data, a grid structure and one or more associated grid characteristics are determined. The sensor data is then converted to grid-based sensor data by associating the grid structure with the raw sensor data (e.g., LiDAR data). The grid-based sensor data can then be used to enable and/or enhance the performance of downstream processing tasks such as object tracking, object detection, or the like.

In example embodiments, a grid structure may include multiple individual unit elements, which may be referred to herein as grid unit elements. Grid characteristics of a grid structure can include any feature that defines an aspect of the grid structure. For instance, grid characteristics may include an overall grid size of the grid structure. The grid size of the grid structure may, in turn, be determined by a respective size of each grid unit element and/or a number of grid unit elements included in the grid structure. In some example embodiments, a grid size of the grid structure may define a scope of a geographic region encompassed by the grid structure. For instance, if a grid structure with a larger grid size is associated with LiDAR point cloud data, this may indicate that a larger spatial region over which the point cloud data is captured is being covered by the grid structure.

In some example embodiments, each grid unit element may be the same size, while in other example embodiments, two or more grid unit elements may differ in size. Thus, in some example embodiments, determining grid characteristics of a grid structure may include determining a grid size for the grid structure, which in turn, may include determining a number of grid unit elements to include in the grid structure and/or determining a respective size of each grid unit element. In example embodiments, increasing a number of grid unit elements while maintaining a same overall grid size for the grid structure may be referred to herein as increasing a granularity of the grid structure. Increasing the granularity of a grid structure can result in each individual grid unit element covering a smaller spatial region, which in turn, increases the likelihood of point cloud data appearing in any given grid unit element within the grid structure. In some example embodiments, grid characteristics of a grid structure are determined based on characteristics of the sensor data (e.g., LiDAR point cloud data). For instance, granularity of the grid structure may be determined based on a distribution of point cloud data over a region corresponding to the grid structure.

In example embodiments, after the grid characteristics of the grid structure are determined, the grid structure is associated with the sensor data to generate grid-based sensor data. In some example embodiments, associating the grid structure with the sensor data includes superimposing the grid structure onto point cloud data included in the sensor data. For instance, the grid structure can be superimposed onto 2D or 3D point cloud data generated by a LiDAR. In this manner, the spatial distribution of data points in the point cloud data can be determined. For instance, the spatial proximity of data points in the point cloud data can be determined based on the proximity of the grid unit elements that contain the data points in the grid-based sensor data. This spatial information can then be used to perform or facilitate downstream processing such as object detection, object tracking, or the like. In certain example embodiments, associating the grid structure with the sensor data may include determining, for each data point in point cloud data included in the sensor data, respective grid unit element to which the data point belongs.

Example embodiments provide a technical solution to a technical problem that is faced in connection with certain autonomous vehicle processing tasks, in particular, a technical problem that results from attempting to perform various types of processing on raw sensor data such as point cloud data obtained from a LiDAR scan. In particular, sensor data such as LiDAR data does not provide spatial information such as the relative spatial proximity of data points in a point cloud. This creates a technical problem when attempting to perform various types of downstream data processing (e.g., object tracking, object detection, etc.) on such data because such processing either cannot feasibly be performed without the spatial information or would require an inordinate amount of processing capacity/time, thereby making the processing unacceptably inefficient, particularly in connection with autonomous vehicle operation where such processing often needs to be performed in real-time or near real-time.

Example embodiments provide a technical solution to the aforementioned technical problem by determining a grid structure and corresponding grid characteristics of the grid structure and converting the sensor data into grid-based sensor data by associating the grid structure with the sensor data. The grid-based sensor data solves the technical problem mentioned above because the grid structure adds spatial information to the sensor data, thereby enabling downstream processing to be performed on the grid-based sensor data where it cannot feasibly or efficiently be performed on the raw sensor data. Further, in some example embodiments, the grid structure and corresponding grid characteristics can be determined based on the sensor data itself. For example, the grid structure and corresponding grid characteristics such as a granularity of the grid structure can be determined based on a distribution of point cloud data. This provides an additional technical benefit because the grid structure and corresponding grid characteristics can be updated dynamically in response to changing sensor data to produce modified grid-based sensor data as needed, thereby improving the efficiency with which downstream processing is performed on the grid-based sensor data.

Illustrative Embodiments

Figure 3:
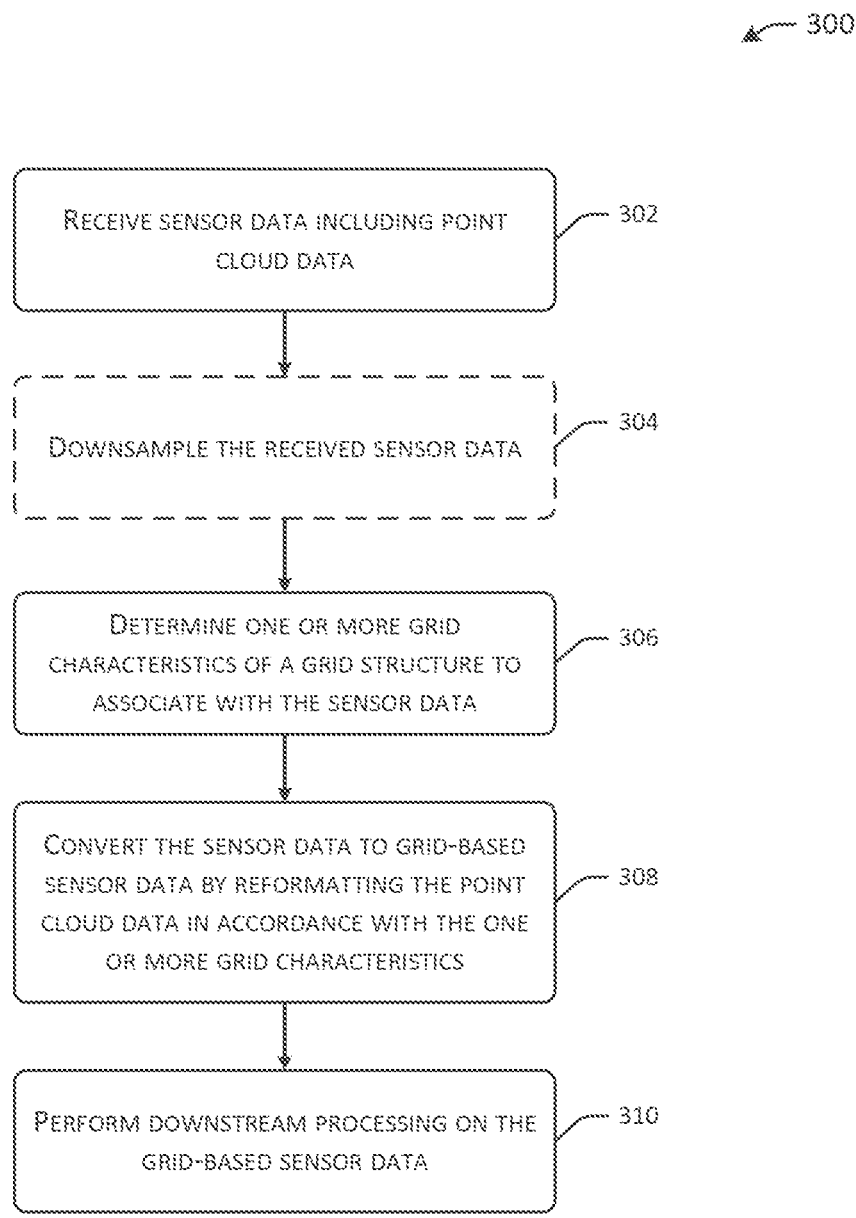
FIG. 3 is a process flow diagram of an illustrative method for performing a data conversion process on sensor data to obtain grid-based sensor data in accordance with an example embodiment of the invention.

FIG. 1 is a hybrid block and data flow diagram illustrating data conversion of sensor data in accordance with an example embodiment of the invention. FIG. 3 is a process flow diagram of an illustrative method 300 for performing a data conversion process on sensor data to obtain grid-based sensor data in accordance with an example embodiment of the invention. FIGS. 1 and 3 will be described in conjunction with one another hereinafter.

Each operation of the method 300 and/or the method 500 (which will be described later in this disclosure) can be performed by one or more of the engines/program modules depicted in FIG. 1 or 5, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 1, a vehicle 102 is depicted. The vehicle 102 may be any object capable of generating locomotive power using an energy source. The energy source may be a liquid fuel such as gasoline or compressed natural gas (CNG); hydrogen fuel cells; electricity such as from one or more batteries; solar energy; biomass; or any other suitable source of energy. The vehicle 102 can be any type of vehicle including, without limitation, a car; a truck; a bus; a motorcycle; an all-terrain vehicle; a ship or other vehicle designed for water travel; a plane or other vehicle designed for air travel bicycle; and so forth. The vehicle 102 may require a human operator or may be a driverless or autonomous vehicle with self-driving capability. In some example embodiments, the vehicle 102 may be capable of certain autonomous driving tasks (e.g., adaptive cruise control, self-parking, etc.), but may require a human operator for operation of the vehicle in circumstances/scenarios in which autonomous capabilities are not available (e.g., local street driving, driving on poorly marked roadways, etc.).

In example embodiments, the vehicle 102 may include various on-board sensors including any of the types of sensors previously described. The sensors may be provided on an exterior and/or an interior of the vehicle 102. The sensors may be communicatively coupled to one or more components of the vehicle 102 such as an electronic control unit (ECC) of the vehicle 102; an on-board vehicle computer; or the like. The sensors may be physically integrated with the vehicle 102 during manufacture of the vehicle 102 or may be attached or otherwise physically connected to the vehicle 102 subsequent to manufacture of the vehicle 102.

Included among the on-board vehicle sensors may be, for example, a LiDAR device 104. In some example embodiments, the LiDAR 104 may be provided as part of a sensor assembly that also includes one or more cameras. In some example embodiments, the sensor assembly may further include other types of sensors such as GPS receivers, IMUs, or the like. The sensor assembly may be positioned, for example, on a roof of the vehicle. For instance, in an example configuration, the LiDAR sensor 104 may be centrally located on a roof of the vehicle 102 and surrounded by multiple cameras that are positioned circumferentially around the LiDAR sensor 104. In example embodiments, the LiDAR sensor 104 may periodically rotate through a scan path during which the LiDAR 104 may illuminate objects in the scanned environment with periodic pulses of light and measure the differences in flight times and wavelengths for light that is reflected back to detect the presence of target objects and generate 3D representations of targets that were illuminated by the light pulses; determine distances between the vehicle 102 and the target objects; determine distances between various target objects; and the like. The LiDAR 108 may exhibit a horizontal scan path and/or a vertical scan path. More specifically, the LiDAR sensor 104 may generate 3D point cloud data 112 (a set of data points in space) representative of target objects that it has illuminated with light during its scan path. The objects illuminated with light from the LiDAR 104 may include one or more stationary objects 106 (e.g., trees, buildings, etc.) and one or more moving objects 108 such as other vehicles. It should be appreciated that the above-described configuration is merely illustrative and that any number of LiDARs and/or other sensors/sensor assemblies may be provided on-board the vehicle 102.

Referring now to FIG. 3 in conjunction with FIG. 1, at block 302 of the method 300, sensor data 110 may be received from one or more on-board sensors of the vehicle 102. The sensor data 110 may include point cloud data 112 received from the LiDAR 104, for example. The point cloud data 112 may be 3D point cloud data that includes sets of data points in 3D space representing target objects illuminated with light pulses from the LiDAR 104. In other example embodiments, the point cloud data 112 may include 2D point cloud data. In certain example embodiments, the sensor data 110 may further include other types of data such as data captured by inertial sensors, data captured by temperature or other environmental condition sensors, image data, or the like. In example embodiments, the sensor data 110 may be received as a continuous stream of data and/or at periodic intervals.

At block 304 of the method 300, a downsampling engine 114 may optionally downsample the received sensor data, in particular, the received point cloud data 112. In example embodiments, downsampling the received point cloud data 112 may include discarding data points in the point cloud data 112 that are redundant (e.g., not necessary) for performing downstream processes. For instance, a set of data points in the point cloud data 112 that corresponds to a particular target object illuminated during a scan of the LiDAR 104 may include one or more data points that can be discarded without impacting the ability to perform object detection, object tracking, or the like on the reduced set of data points. In some example embodiments, the extent to which the downsampling engine 114 performs downsampling on the point cloud data 112 may be dependent, at least in part, on the number of LiDARs that are scanning the environment around the vehicle 102 and the amount of point cloud data 112 that is being received. After performing the downsampling on the point cloud data 112, the downsampling engine 114 may provide the resultant downsampled data 116 to a data conversion engine 122.

At block 306 of the method 300, a grid determination engine 118 may determine one or more grid characteristics 120 of a grid structure to associate with the sensor data 110, in particular, the point cloud data 112. In some example embodiments, the operation of block 306 may occur at least partially concurrently with the operation at block 304. In example embodiments, a grid structure may include multiple grid unit elements. The grid characteristics 120 may include any feature that defines an aspect of a corresponding grid structure. For instance, grid characteristics may include an overall grid size of the grid structure. The grid size of the grid structure may, in turn, be determined by a respective size of each grid unit element and/or a number of grid unit elements included in the grid structure. In some example embodiments, a grid size of the grid structure may define a scope of a geographic region encompassed by the grid structure. For instance, if a grid structure with a larger grid size is associated with the LiDAR point cloud data 112, this may indicate that a larger spatial region over which the point cloud data 112 is captured is being covered by the grid structure.

In some example embodiments, each grid unit element may be the same size, while in other example embodiments, two or more grid unit elements may differ in size. Thus, in some example embodiments, determining the grid characteristics 120 may include determining a grid size for the corresponding grid structure, which in turn, may include determining a number of grid unit elements to include in the grid structure and/or determining a respective size of each grid unit element. In example embodiments, the grid characteristics 120 may include a granularity of the grid structure, which provides an indication of a the corresponding physical region covered by each grid unit element. Increasing the granularity of a grid structure can result in each individual grid unit element covering a smaller spatial region, which in turn, increases the likelihood of at least a portion of the point cloud data 112 appearing in any given grid unit element within the grid structure. In some example embodiments, the grid determination engine 118 may determine the grid characteristics 120 of a grid structure based on characteristics of the sensor data 110 (e.g., LiDAR point cloud data 112). For instance, granularity of the grid structure may be determined based on a distribution of the point cloud data 112 over a region corresponding to the grid structure. After determining the grid characteristics 120, the grid determination engine 118 may provide an indication of the grid characteristics 120 to the data conversion engine 122.

At block 308 of the method 300, the data conversion engine 122 may convert the sensor data 110, in particular, the point cloud data 112 to grid-based sensor data 124 in accordance with the grid characteristics 120. In some example embodiments, converting the sensor data 110 may include associating the grid structure with the sensor data 110 to generate grid-based sensor data 124. In some example embodiments, associating the grid structure with the sensor data 110 includes reformatting the point cloud data 112 included in the sensor data 110 by, for example, superimposing the grid structure onto the point cloud data 112. The grid structure can be superimposed onto 2D or 3D point cloud data.

After the sensor data 110 is converted to the grid-based sensor data 124 by reformatting the point cloud data 112 to include or otherwise be associated with the grid structure and corresponding grid characteristics 120 determined at block 306, the spatial distribution of data points in the point cloud data 112 can be determined from the grid-based sensor data 124. For instance, the spatial proximity of data points in the point cloud data 112 can be determined based on the proximity of the grid unit elements that contain the data points in the grid-based sensor data 124. This spatial information can then be used to perform or facilitate downstream processing 126 such as object detection, object tracking, or the like at block 310 of the method 300.

An example type of downstream processing 126 that can be performed on the grid-based sensor data 124 is object tracking, which involves monitoring and tracking movement of an object (e.g., the vehicle 102, another moving object 108, etc.) over time. In an example embodiment, tracking the movement of an object such as the vehicle 102 includes determining a first set of grid unit elements containing a first portion of the point cloud data 112 corresponding to a position of the vehicle 102 at a first time, determining a second set of grid unit elements that are in a localized region around the first set of grid unit elements within the grid structure, and searching only the second set of grid unit elements for a second portion of the point cloud data corresponding to a position of the vehicle 102 at a second time. In this manner, the processing performance is enhanced because the amount of the point cloud data 112 that needs to be evaluated as part of tracking the vehicle 102 from the first position to the second position is significantly reduced. In particular, only a portion of the point cloud data 112 that is localized around the portion of the point cloud data 112 corresponding to the first set of grid unit elements needs to be evaluated. More specifically, only point cloud data 112 contained in the second set of grid unit elements that includes only those grid unit elements that are within X unit elements of the first set of grid unit elements needs to be evaluated to track the movement of the vehicle 102 from the first position to the second position. That is, point cloud data that is contained in grid unit elements that are not localized around the first set of grid unit elements (e.g., not within X grid unit elements of the first set of grid unit elements) can be ignored in connection with tracking movement of the vehicle 102 from the first position to the second position.

Figure 2:
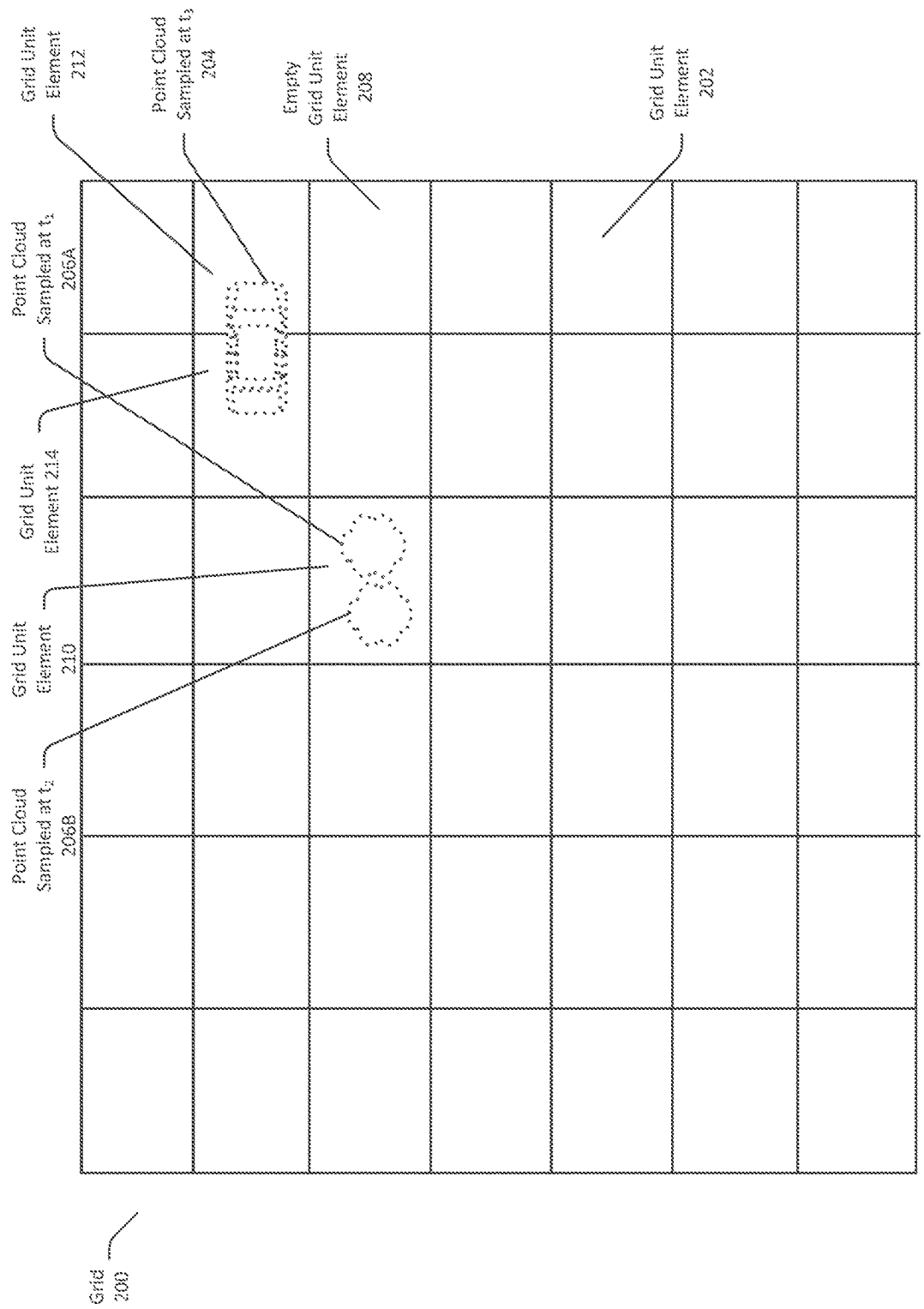
FIG. 2 illustrates example grid-based sensor data in accordance with an example embodiment of the invention.

FIG. 2 illustrates an example embodiment of the grid-based sensor data 124. In this example embodiment, the grid-based sensor data 124 includes a grid structure 200. The grid structure 200 includes a plurality of grid unit elements 202. Each grid unit element 202 is illustratively depicted in FIG. 2 as having a same respective size. In other example embodiments, however, two or more of the grid unit elements 202 may have different sizes, in which case, such grid unit elements may represent geographic regions of different sizes. This, in turn, would result in a grid structure 200 that has a mixed granularity in which the grid unit elements of different sizes represent different levels of granularity.

As further depicted in FIG. 2, the example grid-based sensor data further includes point cloud data (e.g., the point cloud data 112). For example, the grid-based sensor data depicted in FIG. 2 may represent an association (e.g. a superimposition) of the grid structure 200 (and its corresponding grid characteristics 120) onto the point cloud data 112. In example embodiments, portions of the point cloud data 112 may correspond to certain grid unit elements 202 and not to others. More specifically, in example embodiments, one or more grid unit elements may contain one or more data points of the point cloud data 112, while one or more other grid unit elements may contain no data points of the point cloud data 112. For instance, grid unit element 208 is an empty grid unit element containing no data points of the point cloud data 112. In contrast, grid unit elements 210, 212, 214, for example, contain data points of the point cloud data 112. In addition, in some example embodiments, a particular grid unit element (e.g., the grid unit element 210) may contain multiple point clouds 206A, 206B corresponding to multiple target objects that were illuminated with by the LiDAR 104. Further, in some example embodiments, a single point cloud 204 representing a single target object may extend across multiple grid unit elements 212, 214, as depicted in FIG. 2.

In some example embodiments, the point clouds 204, 206A, 206B may be sampled (e.g., captured by LiDAR 104) at least partially concurrently. For instance, in some example embodiments, at least a portion of two or more of the point clouds 204, 206A, 206B may be captured during a same LiDAR scan. In other example embodiments, at least a portion of two or more of the point clouds 204, 206A, 206B may be captured at different times. For instance, at least a portion of the point cloud 206A and at least a portion of the point cloud 206B may be captured as part of different LiDAR scans. Similarly, at least a portion of point cloud 206A and/or at least a portion of point cloud 206B may be captured at a different time from at least a portion of the point cloud 204. More generally, grid-based sensor data may include integrated data from multiple sets of point clouds collected at different times. Moreover, different point clouds may be captured over different durations of time.

As previously described, example embodiments of the invention provide a technical solution to a technical problem that is faced in connection with certain autonomous vehicle processing tasks, in particular, a technical problem that results from attempting to perform various types of downstream processing on raw sensor data such as the point cloud data 112. For example, the point cloud data 112 may not provide spatial information such as the relative spatial proximity of data points in a point cloud. This creates a technical problem when attempting to perform the downstream data processing 126 (e.g., object tracking, object detection, etc.) on such data because such processing either cannot feasibly be performed without the spatial information or would require an inordinate amount of processing capacity/time, thereby making the processing unacceptably inefficient, particularly in connection with autonomous vehicle operation where such processing often needs to be performed in real-time or near real-time.

Example embodiments provide a technical solution to the aforementioned technical problem by determining a grid structure and the corresponding grid characteristics 120 of the grid structure and converting the sensor data 110 into grid-based sensor data 124 by associating the grid structure with the sensor data 110. The grid-based sensor data 124 solves the technical problem mentioned above because the grid structure adds spatial information to the sensor data 110, thereby enabling the downstream processing 126 to be performed on the grid-based sensor data where it cannot feasibly or efficiently be performed on the raw sensor data 110.

Figure 4:
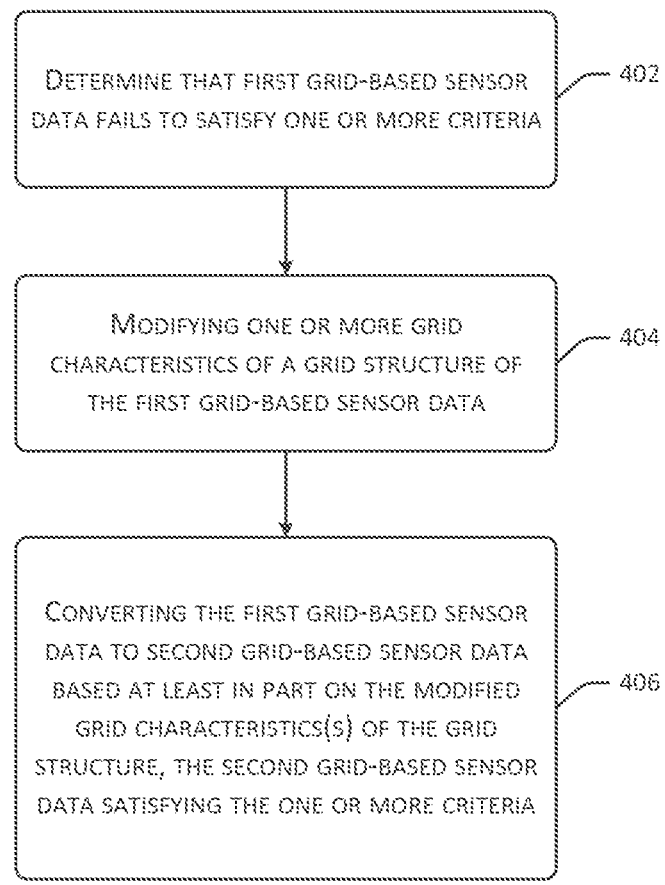
FIG. 4 is a process flow diagram of an illustrative method for modifying grid characteristic(s) of a grid structure associated with grid-based sensor data in accordance with an example embodiment of the invention.

FIG. 4 is a process flow diagram of an illustrative method 400 for modifying grid characteristic(s) of a grid structure associated with grid-based sensor data in accordance with an example embodiment of the invention. FIG. 4 will be described hereinafter in reference to certain other of the Figures such as FIG. 1.

At block 402 of the method 400, the grid determination engine 118 (or the data conversion engine 122), for example, may determine that first grid-based sensor data fails to satisfy one or more criteria. In example embodiments, the criteria may include, without limitation, a maximum threshold number of grid unit elements that are permitted to contain no data points from the point cloud data 112; a maximum threshold number of grid unit elements that can be included in a grid structure; a minimum threshold number of grid unit elements that a grid structure must contain; a minimum or maximum threshold respective size of each grid unit element; a minimum or maximum threshold overall size of the grid structure; and so forth.

At block 404 of the method 400, the grid determination engine 118 may modify one or more of the grid characteristics 120 of the grid structure of the grid-based sensor data 124. For instance, the grid determination engine 118 may determine that more than a maximum threshold number of grid unit elements contain no data points from the point cloud data 112 at block 402, in which case, the grid determination engine 118 may modify a granularity of the grid structure at block 404 to cause each grid unit element to cover a small corresponding geographic region. Then, at block 406 of the method 400, the data conversion engine 122 may convert the original grid-based sensor data to new grid-based sensor data based at least in part on the modified grid characteristics by associating the sensor data (e.g., the point cloud data 112) with a new grid structure corresponding to the modified (e.g., enhanced) granularity. This has the result of increasing the likelihood that the number of grid unit elements containing no data points of the point cloud data 112 will drop below the maximum threshold number.

As another non-limiting example, the grid determination engine 118 may determine at block 402 that the grid-based sensor data 124 has a grid size that is smaller than the minimum threshold grid size required of a grid structure. That is to say, the grid-based sensor data 124 may not be large enough to provide minimum desired coverage of a geographic region. In some example embodiments, this corresponds to a determination that the grid structure lacks a sufficient number of constituent grid unit elements. In such an example scenario, the grid determination engine 118 may generate a modified grid structure with modified grid characteristics at block 404 by, for example, increasing the number and/or size of the grid unit elements of the original grid structure for the grid-based sensor data 124. Then, at block 406, as previously described, the data conversion engine 122 may convert the original grid-based sensor data 124 to new grid-based sensor data that is now associated with a grid structure having at least the minimum threshold grid size. It should be appreciated that the above-described examples of criteria that a grid structure must satisfy and ways in which the grid characteristics of the grid structure an be modified to have the grid structure satisfy such criteria are merely illustrative and not exhaustive.

Hardware Implementation

Figure 5:
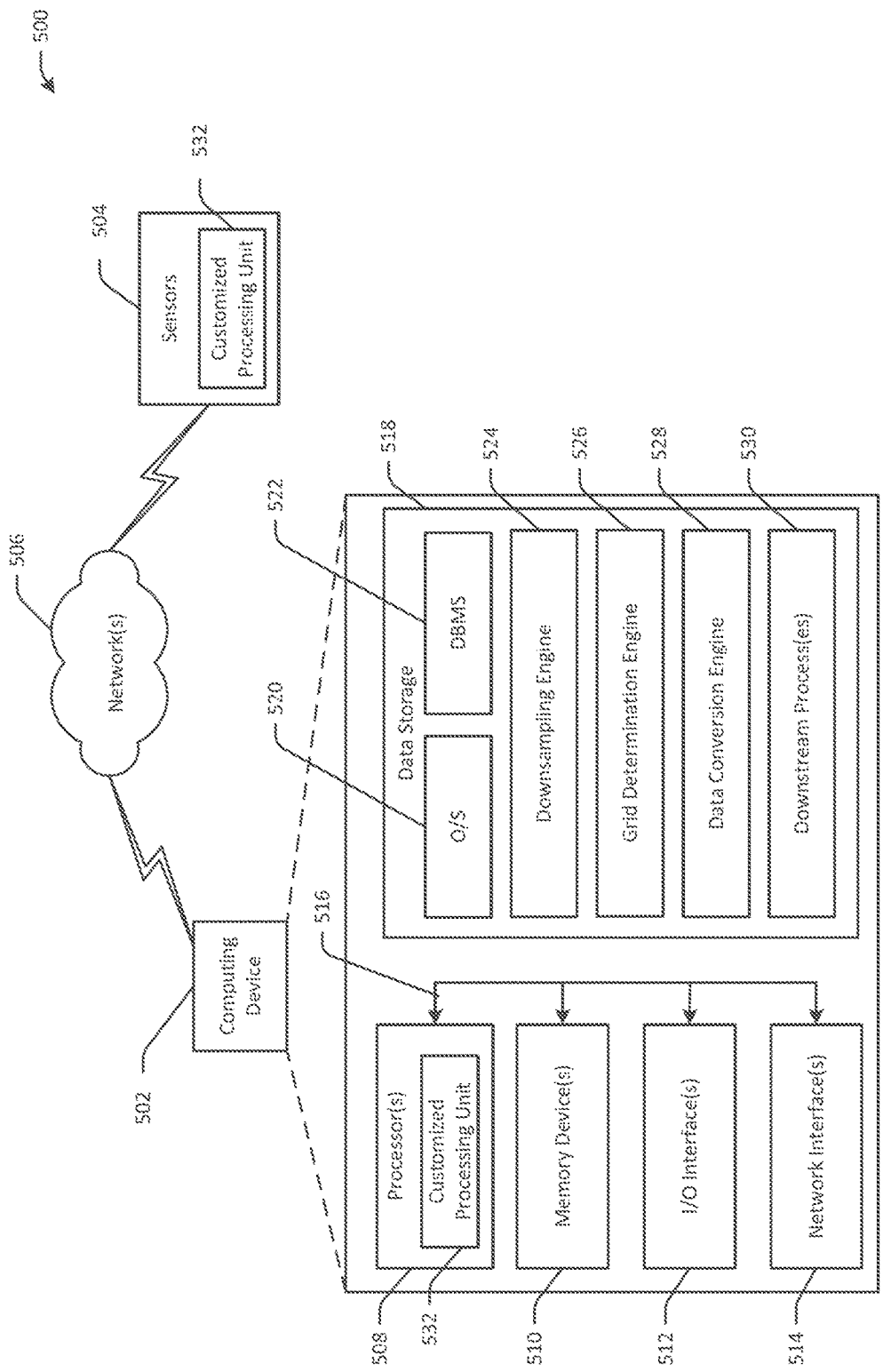
FIG. 5 is a schematic block diagram illustrating an example networked architecture configured to implement example embodiments of the invention.

FIG. 5 is a schematic block diagram illustrating an example networked architecture 500 configured to implement example embodiments of the invention. The networked architecture 500 can include one or more special-purpose computing devices 502 communicatively coupled via one or more networks 506 to various sensors 504. The sensors 504 may include any of the example types of on-board vehicle sensors previously described including, without limitation, LiDAR sensors (e.g. the LiDAR 104), radars, cameras, GPS receivers, sonar-based sensors, ultrasonic sensors, IMUs, accelerometers, gyroscopes, magnetometers, FIR sensors, and so forth. In example embodiments, the sensors 504 may include on-board sensors provided on an exterior or in an interior of a vehicle (e.g., vehicle 102) such as an autonomous vehicle. The special-purpose computing device(s) 502 may include devices that are integrated with a vehicle and may receive sensor data from the sensors 504 via a local network connection (e.g., WiFi, Bluetooth, Dedicated Short Range Communication (DSRC), or the like). In other example embodiments, the special-purpose computing device(s) 502 may be provided remotely from a vehicle and may receive the sensor data from the sensors 504 via one or more long-range networks.

The special-purpose computing device(s) 502 may be hard-wired to perform the techniques of example embodiments of the invention; may include circuitry or digital electronic devices such as one or more ASICs or FPGAs (e.g., customized processing unit 532) that are persistently programmed to perform the techniques; and/or may include one or more hardware processors programmed to perform the techniques pursuant to program instructions in firmware, memory, other storage, or a combination thereof. The special-purpose computing device(s) 502 may also combine custom hard-wired logic, ASICs, or FPGAs with custom programming to accomplish the techniques. For example, the special-purpose computing device 502 may include a customized processing unit 532 such as an ASIC, FPGA, or the like that is configured to perform techniques according to example embodiments of the invention such as generating grid-based sensor data. In other example embodiments, one or more sensors 504 (e.g., each LiDAR device) may each include a respective customized processing unit 532 (e.g., ASIC, FPGA, etc.) configured to perform techniques according to example embodiments of the invention. The special-purpose computing device(s) 502 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 520, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 502 may be controlled by a proprietary operating system. The operating system software 520 may control and schedule computer processes for execution; perform memory management; provide file system, networking, and I/O services; and provide user interface functionality, such as a graphical user interface ("GUI").

While the computing device(s) 502 and/or the sensors 504 may be described herein in the singular, it should be appreciated that multiple instances of any such component can be provided and functionality described in connection any particular component can be distributed across multiple instances of such a component. In certain example embodiments, functionality described herein in connection with any given component of the architecture 500 can be distributed among multiple components of the architecture 500. For example, at least a portion of functionality described as being provided by a computing device 502 may be distributed among multiple such computing devices 502.

The network(s) 506 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 can have any suitable communication range associated therewith and can include, for example, global networks (e.g., the Internet), metropolitan area networks (MANs), wide area networks (WANs), local area networks (LANs), or personal area networks (PANs). In addition, the network(s) 506 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 can include one or more processors (processor(s)) 508, one or more memory devices 510 (generically referred to herein as memory 510), one or more input/output ("I/O") interface(s) 512, one or more network interfaces 515, and data storage 518. The computing device 502 can further include one or more buses 516 that functionally couple various components of the computing device 502. The data storage may store one or more engines, program modules, components, or the like including, without limitation, a downsampling engine 524, a grid determination engine 526, a data conversion engine 528, and one or more engines 530 for facilitating one or more downstream processes. Each of the engines/components depicted in FIG. 5 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 516 can include at least one of a system bus, a memory bus, an address bus, or a message bus, and can permit the exchange of information (e.g., data (including computer-executable code), signaling, etc.) between various components of the computing device 502. The bus(es) 516 can include, without limitation, a memory bus or a memory controller, a peripheral bus, an accelerated graphics port, and so forth. The bus(es) 516 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 510 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 510 may include the data storage 106(1)-106(P) and/or the data storage 120 depicted in FIG. 1. Alternatively, the data storage 106(1)-106(P) may be hard disk storage forming part of the data storage 518 and/or the data storage 120 may be a form of RAM or cache memory that is provided as part of the FOV semantics computing machine 525 itself.

The data storage 518 can include removable storage and/or non-removable storage including, but not limited to, magnetic storage, optical disk storage, and/or tape storage. The data storage 518 can provide non-volatile storage of computer-executable instructions and other data. The memory 510 and the data storage 518, removable and/or non-removable, are examples of computer-readable storage media (CRSM) as that term is used herein. The data storage 518 can store computer-executable code, instructions, or the like that can be loadable into the memory 510 and executable by the processor(s) 508 to cause the processor(s) 508 to perform or initiate various operations. The data storage 518 can additionally store data that can be copied to memory 510 for use by the processor(s) 508 during the execution of the computer-executable instructions. Moreover, output data generated as a result of execution of the computer-executable instructions by the processor(s) 508 can be stored initially in memory 510 and can ultimately be copied to data storage 518 for non-volatile storage.

More specifically, the data storage 518 can store one or more operating systems (O/S) 520 and one or more database management systems (DBMS) 522 configured to access the memory 510 and/or one or more external datastore(s) (not depicted) potentially via one or more of the networks 506. In addition, the data storage 518 may further store one or more program modules, applications, engines, computer-executable code, scripts, or the like. For instance, any of the engines/components depicted in FIG. 5 may be implemented as software and/or firmware that includes computer-executable instructions (e.g., computer-executable program code) loadable into the memory 510 for execution by one or more of the processor(s) 508 to perform any of the techniques described herein.

Although not depicted in FIG. 5, the data storage 518 can further store various types of data utilized by engines/components of the computing device 502. Such data may include, without limitation, sensor data (e.g., point could data 112), downsampled data, data indicative of grid structures/grid characteristics, grid-based sensor data, or the like. Any data stored in the data storage 518 can be loaded into the memory 510 for use by the processor(s) 508 in executing computer-executable program code. In addition, any data stored in the data storage 518 can potentially be stored in one or more external datastores that are accessible via the DBMS 522 and loadable into the memory 510 for use by the processor(s) 508 in executing computer-executable instructions/program code.

The processor(s) 508 can be configured to access the memory 510 and execute computer-executable instructions/program code loaded therein. For example, the processor(s) 508 can be configured to execute computer-executable instructions/program code of the various engines/components of the computing device 502 to cause or facilitate various operations to be performed in accordance with one or more embodiments of the invention. The processor(s) 508 can include any suitable processing unit capable of accepting data as input, processing the input data in accordance with stored computer-executable instructions, and generating output data. The processor(s) 508 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 can be made capable of supporting any of a variety of instruction sets.

Referring now to other illustrative components depicted as being stored in the data storage 518, the O/S 520 can be loaded from the data storage 518 into the memory 510 and can provide an interface between other application software executing on the computing device 502 and hardware resources of the computing device 502. More specifically, the O/S 520 can include a set of computer-executable instructions for managing hardware resources of the computing device 502 and for providing common services to other application programs. In certain example embodiments, the O/S 520 can include or otherwise control execution of one or more of the engines/program modules stored in the data storage 518. The O/S 520 can include any operating system now known or which can be developed in the future including, but not limited to, any server operating system, any mainframe operating system, or any other proprietary or non-proprietary operating system.

The DBMS 522 can be loaded into the memory 510 and can support functionality for accessing, retrieving, storing, and/or manipulating data stored in the memory 510, data stored in the data storage 518, and/or data stored in external datastore(s) (not shown in FIG. 5). The DBMS 522 can use any of a variety of database models (e.g., relational model, object model, etc.) and can support any of a variety of query languages. The DBMS 522 can access data represented in one or more data schemas and stored in any suitable data repository. Datastore(s) that may be accessible by the computing device 502 via the DBMS 522, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 512 can facilitate the receipt of input information by the computing device 502 from one or more I/O devices as well as the output of information from the computing device 502 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 502 or can be separate therefrom. The I/O devices can further include, for example, any number of peripheral devices such as data storage devices, printing devices, and so forth.

The I/O interface(s) 512 can also include an interface for an external peripheral device connection such as universal serial bus (USB), FireWire, Thunderbolt, Ethernet port or other connection protocol that can connect to one or more networks. The I/O interface(s) 512 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 can further include one or more network interfaces 514 via which the computing device 502 can communicate with any of a variety of other systems, platforms, networks, devices, and so forth. The network interface(s) 514 can enable communication, for example, with the sensors 505 and/or one or more other devices via one or more of the network(s) 506. In example embodiments, the network interface(s) 514 provide a two-way data communication coupling to one or more network links that are connected to one or more of the network(s) 506. For example, the network interface(s) 514 may include an integrated services digital network (ISDN) card, a cable modem, a satellite modem, or a modem to provide a data communication connection to a corresponding type of telephone line. As another non-limiting example, the network interface(s) 514 may include a local area network (LAN) card to provide a data communication connection to a compatible LAN (or a wide area network (WAN) component to communicate with a WAN). Wireless links may also be implemented. In any such implementation, the network interface(s) 514 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 505 and the signals on network links and through the network interface(s) 514, which carry the digital data to and from the computing device 502, are example forms of transmission media. In example embodiments, the computing device 502 can send messages and receive data, including program code, through the network(s) 506, network links, and network interface(s) 514. For instance, in the Internet example, a server might transmit a requested code for an application program through the Internet, the ISP, a local network, and a network interface 514. The received code may be executed by a processor 508 as it is received, and/or stored in the data storage 518, or other non-volatile storage for later execution.

It should be appreciated that the engines depicted in FIG. 5 as part of the computing device 502 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 502 and/or hosted on other computing device(s) (e.g., 502) accessible via one or more of the network(s) 506, can be provided to support functionality provided by the engines depicted in FIG. 5 and/or additional or alternate functionality. In addition, engines that support functionality described herein can be implemented, at least partially, in hardware and/or firmware and can be executable across any number of computing devices 502 in accordance with any suitable computing model such as, for example, a client-server model, a peer-to-peer model, and so forth.

It should further be appreciated that the computing device 502 can include alternate and/or additional hardware, software, and/or firmware components beyond those described or depicted without departing from the scope of the invention. More particularly, it should be appreciated that software, firmware, and/or hardware components depicted as forming part of the computing device 502 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 502. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for performing data conversion of sensor data, the method comprising:
   receiving the sensor data;
   determining grid characteristics of a grid structure comprising a plurality of grid unit elements, the grid characteristics comprising a size and a granularity of the grid structure;
   converting the sensor data to grid-based sensor data that enables downstream processing to be performed, the converting comprising associating the grid structure with the sensor data;
   receiving a modification to the sensor data;
   dynamically updating the grid characteristics in response to the received modification to the sensor data, the dynamic updating comprising:
     converting the modified sensor data into modified grid-based sensor data;
     determining whether the grid structure comprises at least a threshold number of grid unit elements that lack corresponding data points of the modified grid-based sensor data;
     in response to determining that the grid structure comprises at least the threshold number of grid unit elements, modifying the grid characteristics to create a modified grid structure that comprises less than the threshold number of grid unit elements that lack corresponding data points of the modified sensor data; and
   performing the downstream processing on the modified grid-based sensor data.

2. The computer-implemented method of claim 1, wherein the sensor data comprises point cloud data, and wherein associating the grid structure with the sensor data comprises reformatting the point cloud data in accordance with the one or more grid characteristics to obtain the grid-based sensor data.

3. The computer-implemented method of claim 2, wherein reformatting the point cloud data in accordance with the one or more grid characteristics comprises determining which grid unit element of the plurality of grid unit elements each data point in the point cloud data corresponds to.

4. The computer-implemented method of claim 2, further comprising downsampling the point cloud data at least in part by discarding a portion of the point cloud data that is unutilized in the downstream processing.

5. The computer-implemented method of claim 2, wherein the grid-based sensor data is first grid-based sensor data, the method further comprising:
   determining that the first grid-based sensor data comprises a particular grid unit element containing no data points of the point cloud data;

modifying the one or more grid characteristics; and
reformatting the point cloud data in accordance with the one or more modified grid characteristics to obtain second grid-based sensor data, the particular grid unit element in the second grid-based sensor data containing at least one data point of the point cloud data.

6. The computer-implemented method of claim 5, wherein modifying the one or more grid characteristics comprises increasing a granularity of the grid structure, and wherein increasing the granularity of the grid structure comprises increasing a number of the plurality of grid unit elements contained in the grid structure.

7. The computer-implemented method of claim 2, wherein the sensor data comprises a respective timestamp associated with each data point of the point cloud data.

8. The computer-implemented method of claim 2, wherein the downstream processing comprises tracking movement of a vehicle, and wherein tracking the movement of the vehicle comprises:
   determining a first set of grid unit elements containing a first portion of the point cloud data corresponding to a position of the vehicle at a first time;
   determining a second set of grid unit elements that are in a localized region around the first set of grid unit elements within the grid structure; and
   searching only the second set of grid unit elements for a second portion of the point cloud data corresponding to a position of the vehicle at a second time.

9. The computer-implemented method of claim 1, wherein determining the one or more grid characteristics comprises determining the granularity of the grid structure based at least in part on a distribution of data points of the point cloud data.

10. A system for performing data conversion of sensor data, the system comprising:
    at least one processor; and
    at least one memory storing computer-executable instructions, wherein the at least one processor is configured to access the at least one memory and execute the computer-executable instructions to:
    receive the sensor data;
    determine grid characteristics of a grid structure comprising a plurality of grid unit elements, the grid characteristics comprising a size and a granularity of the grid structure;
    convert the sensor data to grid-based sensor data that enables downstream processing to be performed, the converting comprising associating the grid structure with the sensor data;
    receive a modification to the sensor data;
    dynamically update the grid characteristics in response to the received modification to the sensor data, the dynamic updating comprising:
      converting the modified sensor data into modified grid-based sensor data;
      determining whether the grid structure comprises at least a threshold number of grid unit elements that lack corresponding data points of the modified grid-based sensor data;
      in response to determining that the grid structure comprises at least the threshold number of grid unit elements, modifying the grid characteristics to create a modified grid structure that comprises less than the threshold number of grid unit elements that lack corresponding data points of the modified sensor data; and
    perform the downstream processing on the modified grid-based sensor data.

11. The of claim 1, wherein the grid structure comprises a two-dimensional (2D) grid structure; and the conversion of the sensor data to grid-based sensor data comprises:
    positioning corresponding data points of successive frames of the sensor data within a threshold distance of each other on the grid-based sensor data.

12. The system of claim 10, wherein determining the one or more grid characteristics comprises determining the granularity of the grid structure based at least in part on a distribution of data points of the point cloud data.

13. The system of claim 10, wherein the sensor data comprises point cloud data, and wherein the at least one processor is configured to associate the grid structure with the sensor data by executing the computer-executable instructions to reformat the point cloud data in accordance with the one or more grid characteristics to obtain the grid-based sensor data.

14. The system of claim 13, wherein the at least one processor is configured to reformat the point cloud data in accordance with the one or more grid characteristics by executing the computer-executable instructions to determine which grid unit element of the plurality of grid unit elements each data point in the point cloud data corresponds to.

15. The system of claim 13, wherein the at least one processor is further configured to execute the computer-executable instructions to downsample the point cloud data at least in part by discarding a portion of the point cloud data that is not necessary for the downstream processing.

16. The system of claim 13, wherein the grid-based sensor data is first grid-based sensor data, and wherein the at least one processor is further configured to execute the computer-executable instructions to:
    determine that the first grid-based sensor data comprises a particular grid unit element containing no data points of the point cloud data;
    modify the one or more grid characteristics; and
    reformat the point cloud data in accordance with the one or more modified grid characteristics to obtain second grid-based sensor data, the particular grid unit element in the second grid-based sensor data containing at least one data point of the point cloud data.

17. The system of claim 16, wherein the at least one processor is configured to modify the one or more grid characteristics by executing the computer-executable instructions to increase a granularity of the grid structure, and wherein increasing the granularity of the grid structure comprises increasing a number of the plurality of grid unit elements contained in the grid structure.

18. The system of claim 13, wherein the point cloud data comprises first point cloud data captured over a first time period and second point cloud data captured over a second time period, wherein the first time period and the second time period are non-overlapping, and wherein the grid-based sensor data integrates the first point cloud data and the second point cloud data.

19. The system of claim 13, wherein the downstream processing comprises tracking movement of a vehicle, and wherein tracking the movement of the vehicle comprises:
    determining a first set of grid unit elements containing a first portion of the point cloud data corresponding to a position of the vehicle at a first time;
    determining a second set of grid unit elements that are in a localized region around the first set of grid unit elements within the grid structure; and searching only the second set of grid unit elements for a second portion of the point cloud data corresponding to a position of the vehicle at a second time.

* * * * *